Oct. 14, 1947.     C. R. BRIGGS     2,428,927
OIL AND WATER SEPARATOR HAVING VERTICALLY SPACED OIL AND WATER OUTLETS
Filed Dec. 17, 1943     2 Sheets-Sheet 1

INVENTOR
CARL R. BRIGGS.
By Hyde and Meyer.
ATTORNEYS.

Oct. 14, 1947.  C. R. BRIGGS  2,428,927
OIL AND WATER SEPARATOR HAVING VERTICALLY SPACED OIL AND WATER OUTLETS
Filed Dec. 17, 1943  2 Sheets-Sheet 2
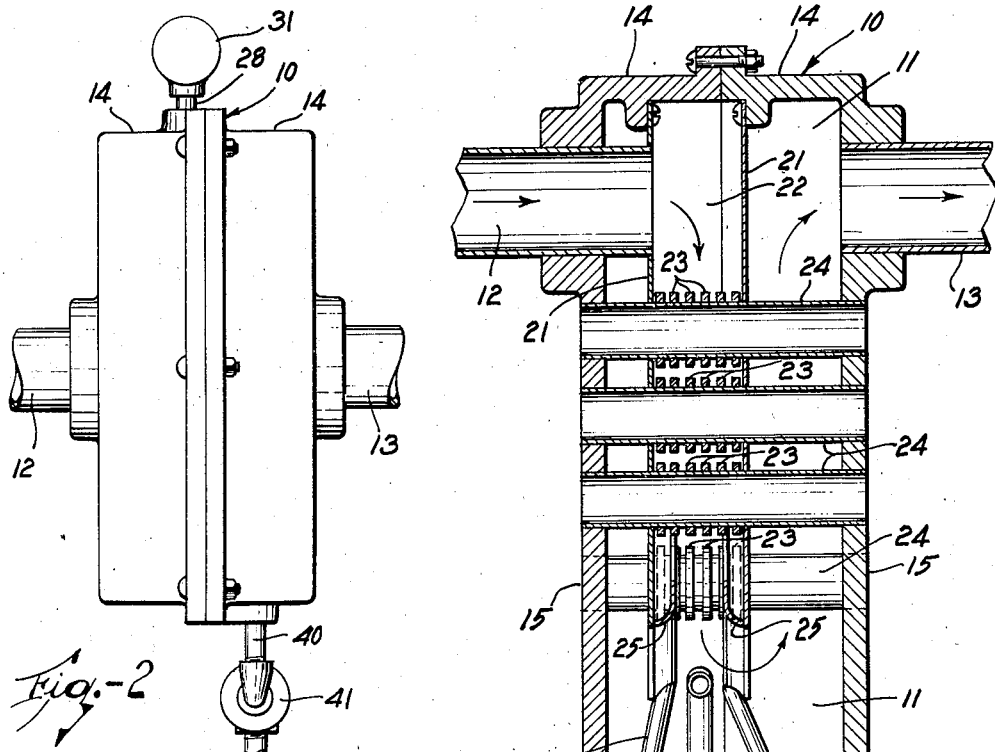
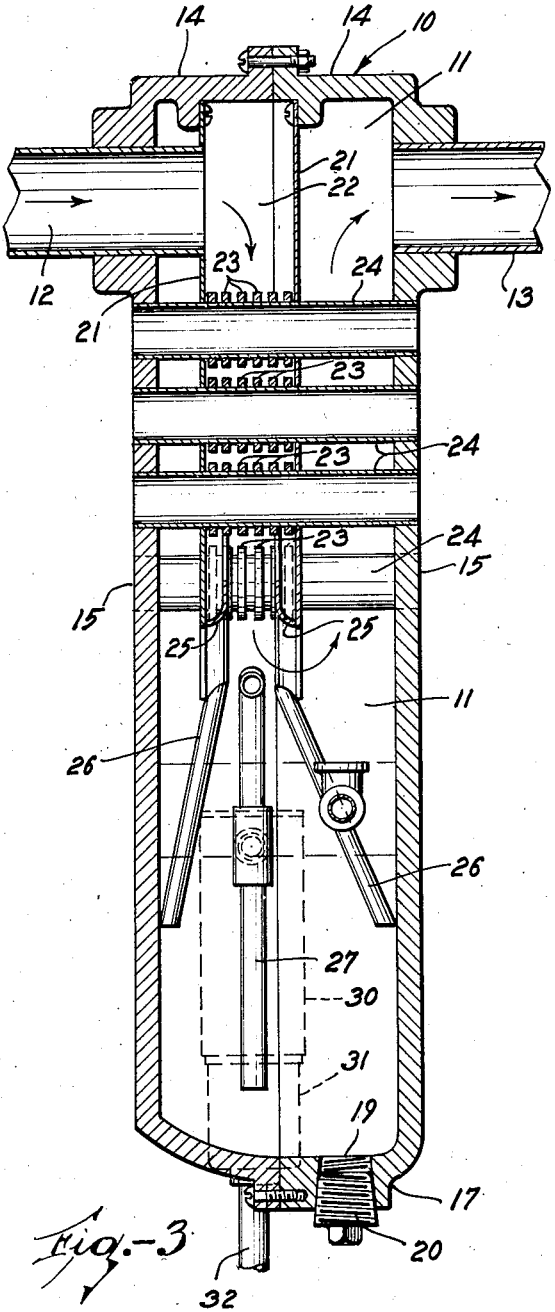
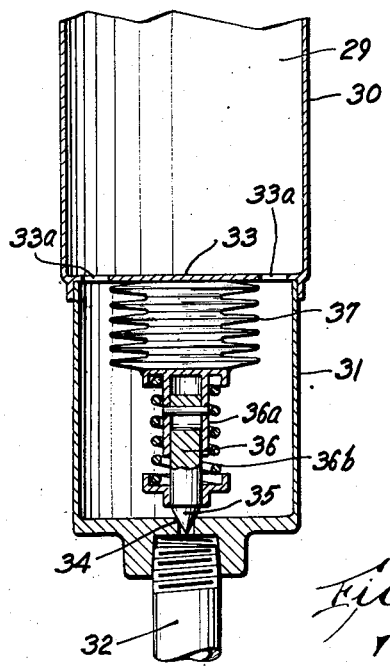
INVENTOR
CARL R. BRIGGS
BY Hyde and Meyer.
ATTORNEYS.

Patented Oct. 14, 1947

2,428,927

UNITED STATES PATENT OFFICE 2,428,927

OIL AND WATER SEPARATOR HAVING VERTICALLY SPACED OIL AND WATER OUTLETS

Carl R. Briggs, Mantua, Ohio, assignor of one-half to John Cunningham, Akron, Ohio Application December 17, 1943, Serial No. 514,608

2 Claims. (Cl. 210—51)

This invention relates to oil separators such as may be used for the separation of oil and grease from the waste steam discharged from a steam engine or other steam operated device or system in which oil or grease may become mixed with the water.

One object of the invention is to provide an improved oil separator of this kind which is entirely automatic in operation, requiring little or no attention from the operator; which is very efficient in operation; which has large capacity for its size; and which prevents or at least minimizes the escape of steam either to the sewer or to the oil collecting vessel or system.

Another object is to provide a separator of this kind which is or may be readily combined with an efficient condenser arranged to deliver the condensate to the separator without turbulence and in a manner to promote stratification as between oil and water preparatory to their separation and conduction to separate outlets or collectors.

Still another object is to provide an improved separator which may be made and assembled at relatively low cost, which is durable in service and not likely to get out of order; and which may be readily installed for service on any exhaust steam line.

Further objects of the invention in part are obvious and in part will appear more in detail hereinafter.

In the drawings, which represent one suitable embodiment of the invention,

Fig. 2 is a plan view;

Fig. 3 is a sectional elevation on the line 3—3, Fig. 1; and

Fig. 4 is a detail sectional elevation through one of the automatic valve devices.

Figure 1:
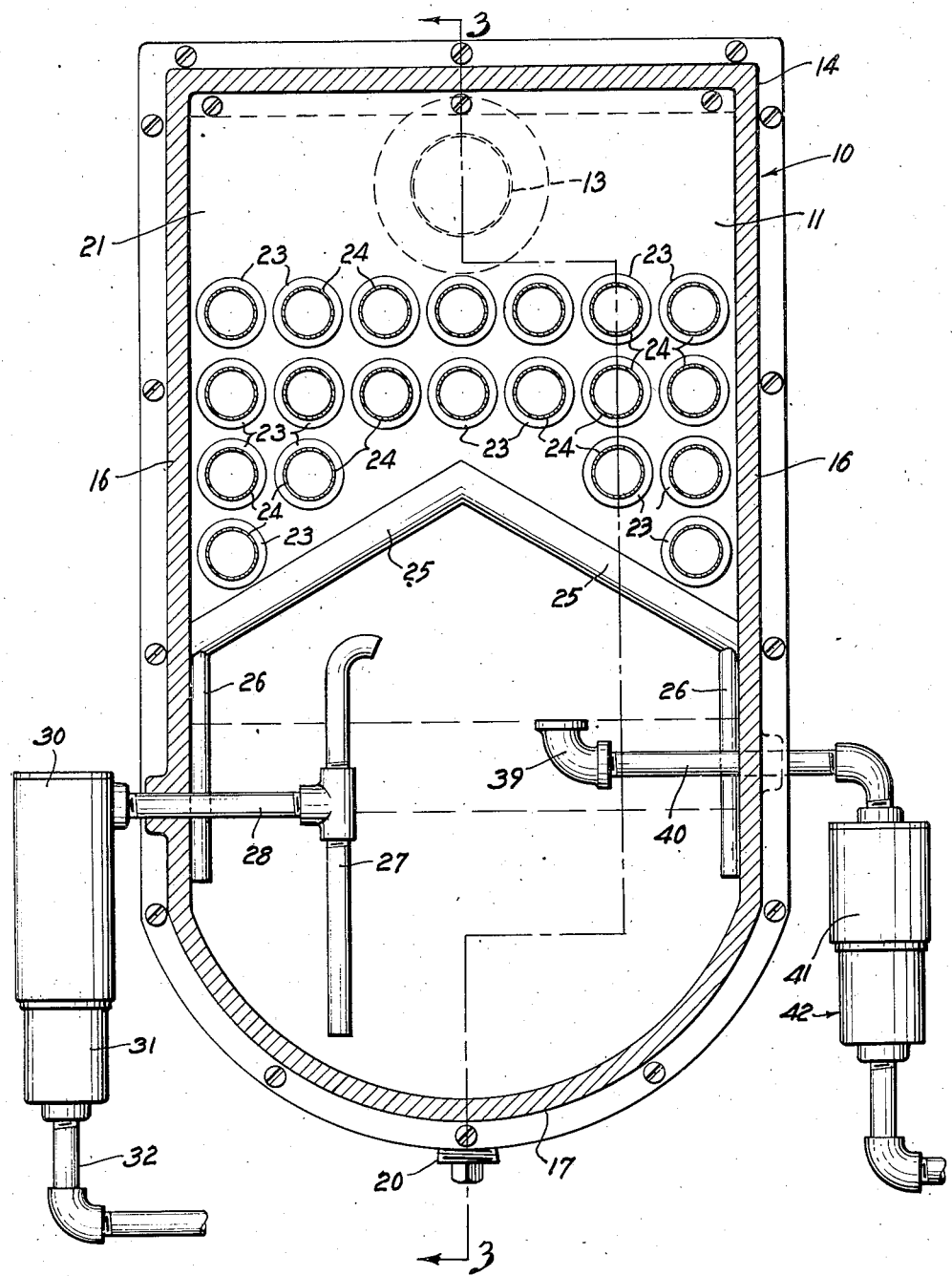
Fig. 1 is a longitudinal sectional elevation.

The separator shown in the drawings comprises a suitable hollow body or casing 10 enclosing a chamber 11 with which steam supply and discharge pipes or conduits 12, 13 communicate, the supply pipe being that which ordinarily carries to the sewer or to a waste outlet the waste steam from a steam engine (not shown) or any other device or system employing steam. Body 10 is shown made of two dished halves or members 14, 14, bolted together along a parting plane, providing two opposed parallel flat side walls 15, 15, end walls 16 and a curved bottom 17. Bottom 17 may be provided with a threaded connection 19 normally closed by a plug 20 but to which a drain pipe may be connected for clean out or other purposes.

The exhaust steam to be treated is first condensed or cooled for collection as liquid, after which the liquid mixture of oil in water is separated into its two constituents. Accordingly the upper portion of the device is utilized for condensing and the lower portion for separating purposes. Pipes 12, 13 open through walls 15 near their upper ends, but pipe 12 continues beyond its wall 15 and through one of two opposed parallel baffling and condensing plates 21 spaced apart and from the walls 15 and forming between them a condensing chamber 22. As the hot steam travels downwardly in chamber 22 it passes over a series of heat conducting rings or fins 23 upon a suitable number (20 being shown) of tubes 24 mounted in and extending through the walls 15 and plates 21 and open at both ends and through which flows cooling air either by ordinary convection or impelled by a fan or blower (not shown). The combined cooling effects of plates 21, fins 23, tubes 24 and the air streams through said tubes causes the oil and steam to condense and as liquid run down along the plates into the channels 25 formed by the upturned edge portions of said plates. These channels slope toward the end walls 16, where tubes 26 conduct the liquid downwardly and discharge it quietly into the body of liquid in the bottom of the separator below the overflow level. Thus, as exhaust steam is delivered to the device by way of conduit 12, it enters condensing chamber 22, flows downwardly past the finned tubes 24 into the lower portion of chamber 11, then upwardly through said chamber and again past the tubes 24 and to the discharge conduit 13. During its passage a large part of the steam is condensed and the water formed, together with any oil or grease present, is collected in the lower part of chamber 11.

The outlet for water is by way of a vertically extending pipe 27 open at its lower end at a low level in the liquid and at its upper end open to the steam space in chamber 11 well above any level to which the liquid may rise. Said pipe communicates by way of pipe 28 with the chamber 29 in a vessel 30, a tubular extension 31 of which communicates with a pipe 32 leading to the sewer. The cross wall 33 between vessel 30 and its extension 31 is provided with openings 33a and the bottom wall of the extension with a seat 34 for a valve 35 carried by a stem 36 connecting it to a thermostatic control device, such as the Sylphon bellows 37. Valve 35 preferably is suitably adjustable or yieldable with reference to the bellows 37. As shown, the valve stem 36 is slidable in a tube 36a attached to the bellows, and sensitive to a compression spring 36b, expansion of which is limited by a pin and elongated slot connection between stem 36 and tube 36a. Spring 36b makes the valve slightly yieldable and takes up lost motion should the bellows tend to expand or elongate more than enough to seat the valve.

The oil outlet is by way of a fitting 39 opening upwardly into chamber 11 at a level above that of the top of the channel in the horizontal pipe 28 and communicating by way of pipe 40 with the chamber in a vessel 41 the outlet from which is controlled by thermostatic valve mechanism marked 42 and similar in all respects to that before described in connection with the water outlet.

It will be apparent, from the description above, and from a consideration of the drawings, that the bottom open end of pipe 27 constitutes a downwardly opening water intake port for the water discharge means, and that the water overflow passage within pipe 28 determines the water discharge level. It will be further apparent that the open end of pipe fitting 39 constitutes an oil intake port for the oil discharge means, and that said oil intake port determines the top oil level, and consequently the top liquid level in chamber 11.

The operation is as follows:

Since the specific gravity of the oil and grease usually accompanying exhaust steam from an engine or the like is of the order of .9, the pipe 27 should extend down into the liquid and its lower end open therein at a level somewhat greater than about 10 times the difference in level between the top of the channel in pipe 28 and the upwardly opening end of the fitting 39. That is, if such difference in level is, say, two inches, the depending portion of pipe 27 should be 22–24 inches long.

It is obvious that to cause a column of water arising in the depending portion of pipe 27 to reach the water discharge level determined by pipe 28, it must be counter-balanced by a hydrostatic column of equal weight on the exterior of pipe 27. If only water is in the casing outside pipe 27, the levels within and without pipe 27 will of course be equal in height.

If a stratum of oil or grease is supported on the water in the casing outside pipe 27, the equilibrium surface levels within and without pipe 27 will not be coplanar, but the level outside pipe 27 will be higher by reason of the lower specific gravity resulting from the oil or grease component. The said difference in levels will vary, depending on the relative heights of oil and water outside pipe 27, and above its inlet port at its bottom end.

If I designate by "A" the vertical distance between the water discharge level determined by pipe 28, and the oil discharge level represented by elbow 39 (Fig. 1), and further designate by "B" the vertical distance between said water discharge level and the water inlet port at the bottom of pipe 27, the ratio of distance B to distance A should be at least 10 to 1, as will be obvious from the following consideration.

If B is less than 10 times A, then it is conceivable, though not usually encountered if the oil-steam composition is normal, that the oil stratum, growing by accretion, would build downwardly until its lower surface fell below the water inlet port in pipe 27, and the oil would then enter pipe 27 since the weight of the hydrostatic column of water in pipe 27 is insufficient to raise the outer hydrostatic column of water and oil to the oil discharge level. Water would accordingly discharge until the oil stratum extended downwardly to the water inlet port.

As long as the water column in the depending portion of pipe 27 is long enough to permit its specific gravity to counterbalance the weight of the outer hydrostatic column of oil and water, and permit a rising oil surface to intermittently reach the oil discharge level, the device will operate as intended and described. Calculations of any number of specific examples, varying in oil to water ratios, can easily be made to demonstrate that if the oil is of specific gravity 0.9, then the ratio of B to A should be at least 10 to 1 to ensure absolutely reliable automatic operation, and by increasing this ratio to 11 to 1 or 12 to 1 an additional safety factor is provided to take care of specific gravity variations.

The quoted ratios provide an absolutely safe and automatic operation without either liquid being emitted through the wrong port. If the distance B is greater than the distance A, but not ten times as great, then the device will operate satisfactorily with occasional visual observation and occasional correction, or removal of possible accumulating oil by stopping the water outflow until the rising water level carries the oil above its discharge level.

The thermostatic valve devices are of such form that the valves close when the Sylphon bellows are hot, i. e., when they are subjected to the temperature of the exhaust steam, or thereabout. At lower temperatures, say below 100° to 150° F. the bellows contracts and the valve opens.

Let us assume that with the device in operation, condensed liquid collects in chamber 11 to an amount sufficient to cover the lower end of pipe 27. The upper end of pipe 27 and fitting 39 are both open to the steam space. Consequently steam enters each of vessels 30 and 41 and is effective upon the two Sylphon bellows and the valves are both closed. Finally the level of liquid reaches the pipe 28 and as further liquid is condensed and collected water flows into vessel 30. This liquid is entirely water, since the oil and grease are floating on top of the water in chamber 11. Ultimately vessel 30 and pipe 28 become filled with water and in the end cool to a point where the bellows contracts and opens valve 35. Water then flows past said valve to the outlet until steam enters pipe 28 above the water therein and heats vessel 30 and the bellows 37 until valve 35 closes. The level of liquid again rises, shuts off steam flow to vessel 30, the bellows cools and the valve opens again, and so on repeatedly.

Thus, at the water outlet, there is an intermittent or spasmodic operation, with the valve 35 opening at intervals, and with the upper level of the liquid column within pipe 27 rising above and sinking below the water line at the top of the channel in pipe 28. The open top of pipe 27, of course, prevents siphonic action.

While water discharge is going on, of course, more and more oil is collecting upon the top of the liquid in chamber 11, and the discharge of this oil through fitting 39 and the thermostatic valve mechanism 42 occurs intermittently by an operation similar to that at the water outlet and requiring no detailed description.

Of course, in the design of the parts some consideration must be given to certain factors, such as the rate of delivery of liquid to the device, the proportion of oil to water in the mixture, the specific gravity of the oil, etc. For example, the drop in temperature necessary to open either valve should not be too great. Otherwise too much liquid will collect in chamber 11 and water might flow into the oil outlet. Accordingly either the thermostatic device, or the valve which it operates, is adjusted so that the valve opens at the desired temperature.

The difference in level between pipe 28 and the open end of fitting 39 should not be too great. Otherwise the plane of separation between the oil and water strata might be depressed until oil enters the lower end of pipe 27. Accordingly that difference in level, and the length of the depending portion of pipe 27, are made such as normally maintain such plane of separation suitably below the upper end and above the lower end of pipe 27. The difference in level is readily adjusted by rotation of the fitting 39 on its supporting pipe 40, or any equivalent arrangement.

The capacities of vessels 30 and 41 relative to that of chamber 11 and to the adjustment of the bellows is also important. Each vessel preferably should nearly if not entirely empty while its valve remains open.

With all factors suitably designed and proportioned, the device functions satisfactorily, completely separating all oil and grease from the exhaust steam and separately delivering the oil and water to any desired collecting vessels, at the same time preventing outflow of steam with either water or oil. It requires no attention and is fully automatic.

Other advantages of the invention will be apparent to those skilled in the art.

What I claim is:

1. Apparatus for the separation of oil from exhaust steam comprising a casing having a liquid containing chamber in which oil and water fractions separate by gravity into different strata, said chamber being provided with oil discharge means comprising an oil intake port disposed within said chamber, and spaced inwardly from the wall of said chamber, and in liquid communication with the chamber exterior, said oil intake port being in liquid communication with the chamber exterior through an oil discharge passage, said chamber being further provided with water discharge means comprising a downwardly opening water intake port disposed within said chamber and spaced from the chamber bottom, said water intake port being in liquid communication with the chamber exterior through a water overflow passage, said water overflow passage determining the highest water level in the chamber, and said oil intake port determining the highest liquid level in the chamber, said water overflow passage being below the level of said oil intake port, said water intake port being likewise spaced inwardly from the chamber wall, and the distance from each said intake port to the chamber wall through which its discharge fluid proceeds being greater than one-half the horizontal distance between said intake ports.

2. Apparatus for the separation of oil from exhaust steam comprising a casing having a liquid containing chamber in which oil and water fractions separate by gravity into different strata, said chamber being provided with oil discharge means comprising an oil intake port disposed within said chamber, and spaced inwardly from the wall of said chamber, and in liquid communication with the chamber exterior, said oil intake port being in liquid communication with the chamber exterior through an oil discharge passage, said chamber being further provided with water discharge means comprising a downwardly opening water intake port disposed within said chamber and spaced from the chamber bottom, said water intake port being in liquid communication with the chamber exterior through a water overflow passage, said water overflow passage determining the highest water level in the chamber, and said oil intake port determining the highest liquid level in the chamber, said water overflow passage being below the level of said oil intake port said oil intake port being adjustable in height within said chamber whereby to control the highest liquid level, and also the distance between said highest liquid level and the highest water level in the chamber said water intake port being likewise spaced inwardly from the chamber wall, and the distance from each said intake port to the chamber wall through which its discharge fluid proceeds being greater than one-half the horizontal distance between said intake ports.

CARL R. BRIGGS.

REFERENCES CITED

The following references are of record in the file of this patent:

UNITED STATES PATENTS

| Number | Name | Date |
| --- | --- | --- |
| 1,119,565 | Baldwin et al. | Dec. 1, 1914 |
| 1,531,485 | Lauer | Mar. 31, 1925 |
| 2,164,974 | Weisgerber | July 4, 1939 |
| 2,205,336 | Beach | June 18, 1940 |
| 1,140,118 | Collins | May 18, 1915 |
| 1,777,535 | Stratford | Oct. 7, 1930 |
| 338,772 | Polte | Mar. 30, 1886 |
| 1,984,003 | Welsh | Dec. 11, 1934 |
| 247,280 | Welz et al. | Sept. 20, 1881 |
| 654,965 | Franke | July 31, 1900 |
| 911,314 | Maranville | Feb. 2, 1909 |
| 914,138 | Grahn | Mar. 2, 1909 |
| 1,032,458 | White | July 16, 1912 |
| 1,459,486 | Whitney et al. | June 19, 1923 |
| 2,122,310 | Burt | June 28, 1938 |
| 591,394 | Fahy | Oct. 12, 1897 |
| 1,513,882 | Bateman | Nov. 4, 1924 |
| 306,169 | Moseley | Oct. 7, 1884 |
| 1,396,889 | Sepulchre | Nov. 15, 1921 |